United States Patent [19]
Williams et al.

[11] 3,831,901
[45] Aug. 27, 1974

[54] VEHICLE JACK WITH LOCKING MEANS

[75] Inventors: Donald M. Williams, 3283 Spruce, Inkster; Charles S. Seidel, Royal Oak, both of Mich.

[73] Assignee: Donald M. Williams, Inkster, Mich.

[22] Filed: Oct. 19, 1972

[21] Appl. No.: 298,880

[52] U.S. Cl. .................................. 254/93 R, 92/15
[51] Int. Cl. .............................................. B66f 3/24
[58] Field of Search............ 254/93 R, 93 H, 93 HP, 254/93 L, 20; 92/15, 21; 187/8.47, 8.49; 91/168

[56] References Cited
UNITED STATES PATENTS

| | | | |
|---|---|---|---|
| 1,213,363 | 1/1917 | Henry | 92/18 |
| 2,329,044 | 9/1943 | Grollmer | 91/168 |
| 2,562,493 | 7/1951 | Harris | 254/93 HP |
| 2,736,531 | 2/1956 | Wilson | 254/93 H |
| 2,872,904 | 2/1959 | Van Den Beemt | 92/19 X |
| 3,658,189 | 4/1972 | Brown et al. | 91/168 X |

Primary Examiner—Othell M. Simpson
Attorney, Agent, or Firm—Hauke, Gifford, Patalidis & Dumont

[57] ABSTRACT

A fluid pressure operated vehicle jack comprising telescoping members adapted to be extended upon connection with a container of pressurized air. Automatically actuated safety means are provided which lock the members in the extended position.

5 Claims, 8 Drawing Figures

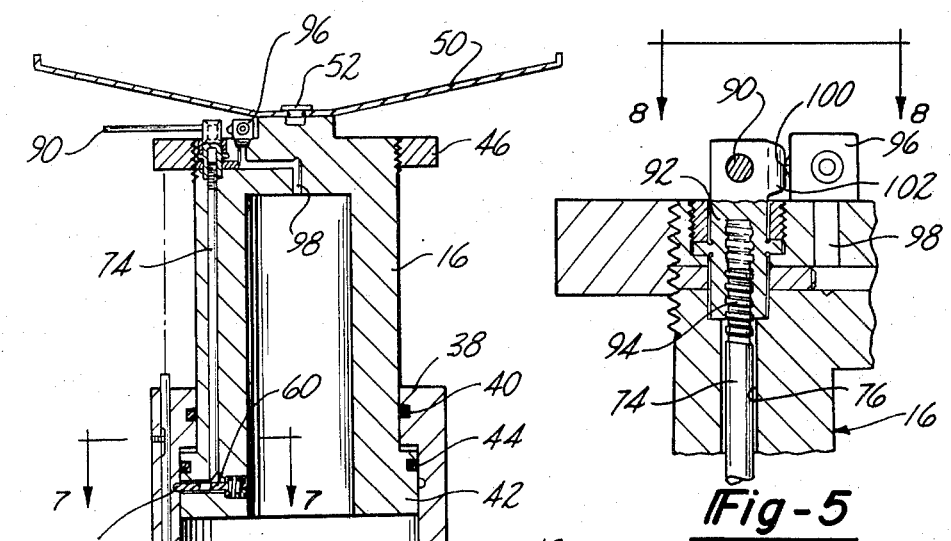
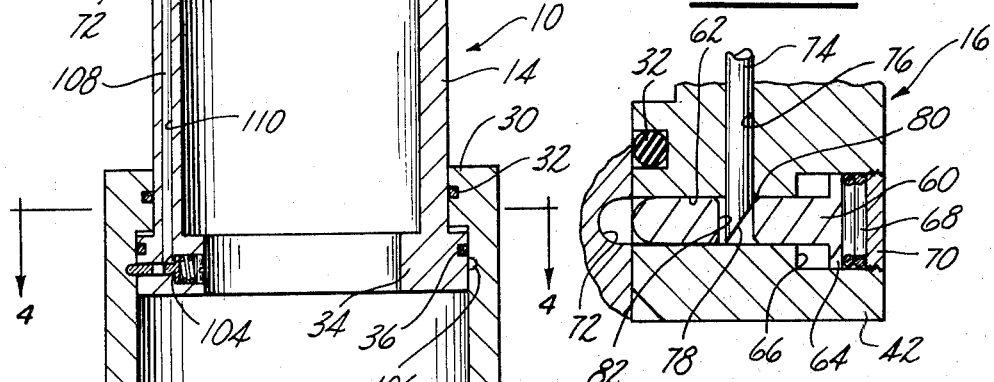
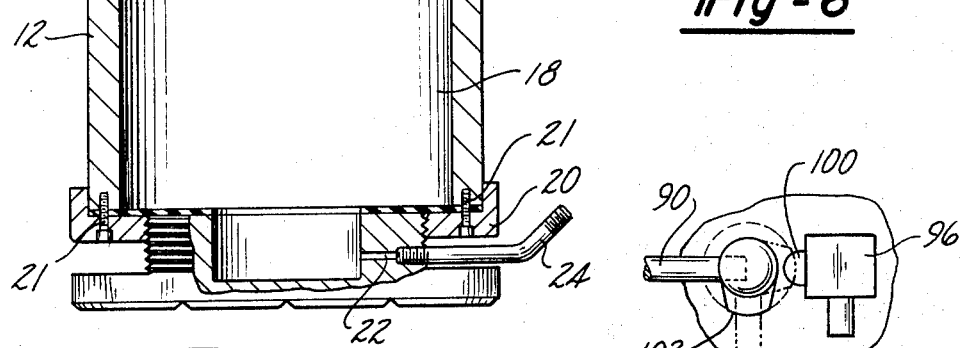
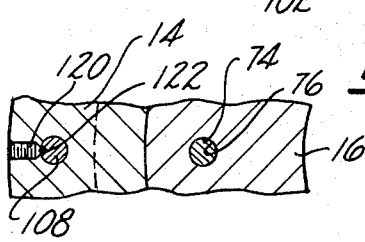
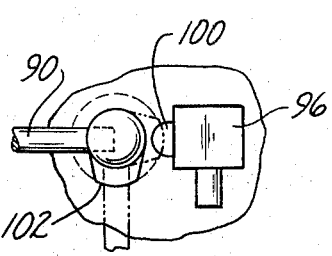

VEHICLE JACK WITH LOCKING MEANS

BACKGROUND OF THE INVENTION

I. Field of the Invention

The present invention relates to vehicle jacks and more particularly to fluid actuated, telescoping jacks especially suitable for lifting motor vehicles such as automobiles, trucks, etc.

II. Description of the Prior Art

Most vehicle jacks presently in use require a great deal of exertion on the part of the user to lift the vehicle from the ground. In addition there are no vehicle jacks known to the present inventors which include reliable safety devices for preventing the jack from accidentally collapsing. Hydraulic jacks for instance suffer the danger of leakage and the consequent collapse of the telescoping members. If the user is beneath the vehicle when this occurs, serious injury can result. Mechanical jacks, such as the bumper jacks commonly provided by automobile manufacturers, require a sturdy bumper on the vehicle and, because the bumper must be raised quite high to bring the wheel of the vehicle off the ground, tipping of the jack is a common problem experienced with these types of jacks.

SUMMARY OF THE PRESENT INVENTION

The present invention provides an improved jack for vehicles designed to be positioned beneath the frame or axle of a vehicle and to then be actuated by connection with a cannister of air under pressure to move telescoping members of the jack to an extended position to thereby lift the vehicle. The cannister for actuating the jack is designed to be filled at a service station from the compressor utilized to fill tires or it can, in an emergency, be filled from a tire itself. The use of compressed air to actuate the jack eliminates the effort necessary to raise vehicles with jacks now commonly available.

In addition a built in safety means is provided which upon extension of the jack automatically locks the telescoping members in an extended position. This prevents collapse of the members and consequent possible injury to the user or damage to the vehicle. Such damage could occur, for instance, in the absence of safety means if air should leak from the device. The safety means of the present invention comprises internal pins which automatically snap into place to lock the members together when they are extended. Opening the valve to lower the jack unlocks the pins in sequence so that the telescoping members slowly collapse to lower the vehicle.

DESCRIPTION OF THE DRAWINGS

A better understanding of the present invention will be achieved upon reference to the following drawings in which like reference characters refer to like parts throughout the several views and in which:

FIG. 3 is a longitudinal cross-sectional view of the jack shown in FIGS. 1 and 2 but enlarged somewhat for purposes of clarity;

FIG. 5 is a fragmentary view of a portion of the structure shown in FIG. 3 enlarged somewhat for purposes of clarity;

FIG. 6 is a fragmentary view of a portion of the structure shown in FIG. 3 enlarged somewhat for purposes of clarity;

FIG. 7 is a cross-sectional view substantially as seen from line 7—7 of FIG. 3 enlarged somewhat for purposes of clarity; and FIG. 8 is a view substantially as seen from line 8—8 of FIG. 5.

DESCRIPTION OF A PREFERRED EMBODIMENT

Figure 1:
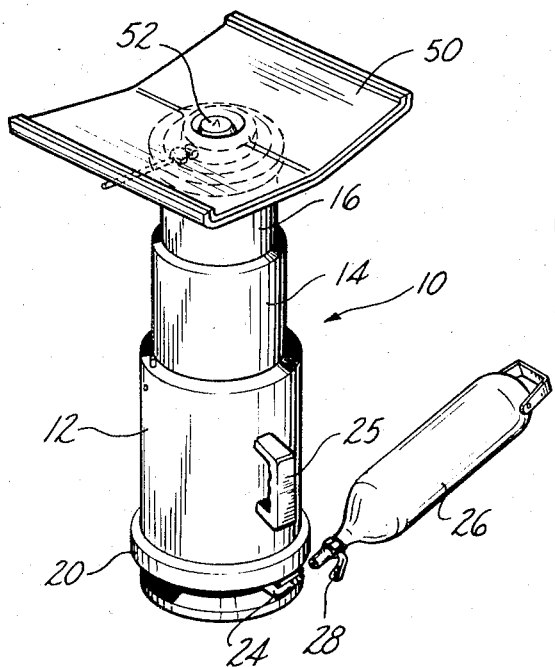
FIG. 1 is a perspective view of a vehicle jack of the present invention in an extended position.

Now referring to the drawings for a more detailed description of the present invention, a preferred vehicle jack 10 is illustrated in an extended position in FIG. 1 as comprising a lower member 12, an intermediate member 14 and an upper member 16. Although it has been preferred to illustrate the vehicle jack 10 of the present invention as comprising three telescoping members 12, 14 and 16 it is to be understood, and it will become more apparent as the description proceeds, that the vehicle jack 10 could be constructed of fewer or more of these telescoping members without departing from the present invention.

As can best be seen in FIG. 3 the members 12, 14 and 16 are hollow to define a central chamber 18. A base member 20 is mounted to the lower member 12 by screws 21 and includes a passage 22 providing communication between an inlet valve 24 and the chamber 18. Other means for fastening the base member 20 to the lower member 12 could be used if preferred. A handle 25 is formed on the exterior surface of the lower member 12.

The inlet valve 24 extends exteriorly of the base 20 and is adapted to be connected to a cannister 26 (FIG. 1). The cannister 26 is adapted to be filled with air under pressure so that upon connection with the inlet valve 24 and actuation of the valve 28 of the cannister 26, compressed air will be transferred from the cannister 26 to the chamber 18.

Still referring to FIG. 3, the lower member 12 is formed with an inwardly extending flange portion 30 at its upper end. The flange portion 30 slidably engages the exterior surface of the intermediate member 16 and carries an O-ring 32 which aids in preventing fluid leakage from the chamber 18. The intermediate member 14 has an outwardly extending flange portion 34 adapted to slidably engage the inner surface of the lower member 12 as the jack 10 is moved between a retracted and an extended position. An O-ring 36 is carried by the flange portion 34 to engage the inner surface of the lower member 12 and to cooperate with the O-ring 32 to provide a double seal between the members 12 and 14.

The intermediate member 14 is provided with an inwardly formed flange portion 38 at its upper end carrying an O-ring 40 slidably engaging the exterior surface of the upper member 16. The upper member 16 is provided with an outwardly extending flange 42 at its lower end carrying an O-ring 44 slidably engaging the inner surface of the intermediate member 14.

Figure 2:
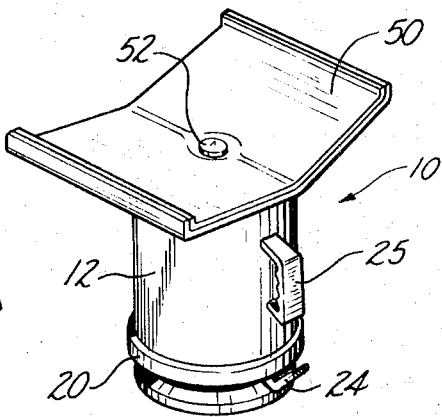
FIG. 2 is a perspective view of the vehicle jack shown in FIG. 1 but in a retracted position.
Figure 4:
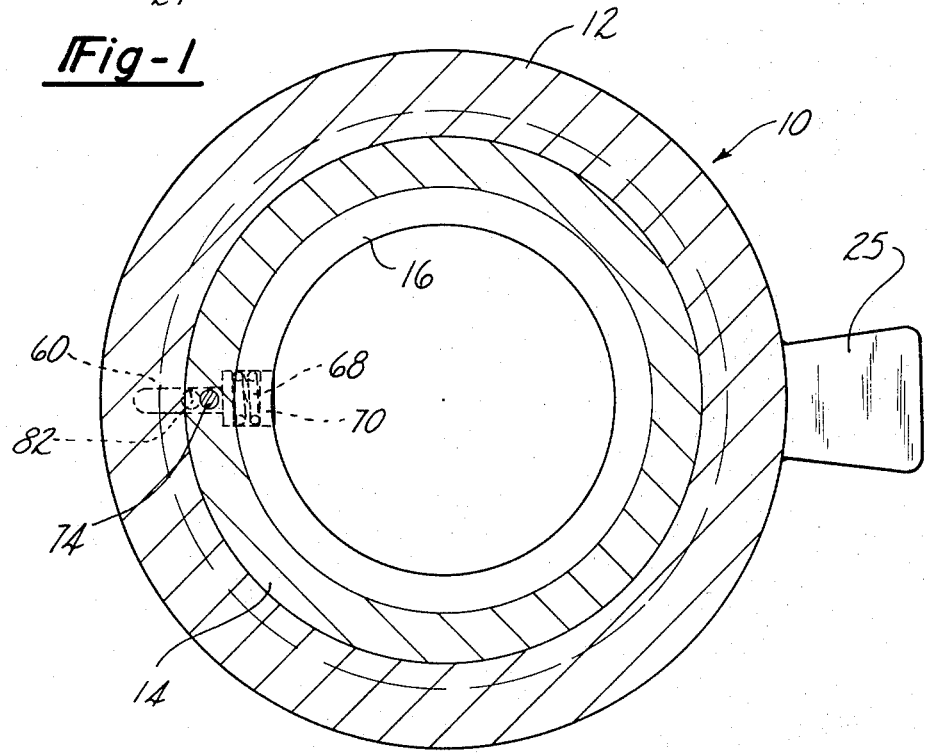
FIG. 4 is a cross-sectional view taken substantially on line 4—4 of FIG. 3 enlarged somewhat for purposes of clarity.

The upper end of the upper member 16 is preferably closed and the base 20 closes the lower end of the chamber 18 so that air under pressure from the cannister 26 expands the chamber 18 to move the members 12, 14 and 16 from the retracted position shown in FIG. 2 to the extended position shown in FIG. 1.

An internally threaded flange member 46 is mounted to a threaded outer surface portion 48 of the upper member 16. A lift member 50 is mounted to the upper surface of the member 16 by a fastener 52. The fastener 52 permits the lift member 50 to rotate about the axis of the jack 10.

Assembly of the jack 10 is accomplished by first inserting the upper member 16, with the lift member 50 and the flange member 46 removed, through the bottom of the intermediate member 14. The assembled upper member 16 and intermediate member 14 are then inserted through the bottom of the lower member 12. The lift member 50 and the flange member 46 are then attached to the upper member 16 and the base member 20 is attached to the lower member 12. This prevents the members 12, 14 and 16 from separating.

To provide a means for preventing the extended members 12, 14 and 16 from collapsing by reason of leakage of air a safety means is provided. The safety means is automatically operable to first lock the upper member 16 in its extended position to the intermediate member 14. When the intermediate member 14 is then moved to its extended position it is automatically locked to the lower member 12. If the air is accidentally relieved from the chamber 18 the safety means will prevent the members 12, 14 and 16 from collapsing. When it is desired to release the air from the chamber 18 to permit the jack 10 to collapse a valve is actuated to release the air and at the same time release the lock between the upper member 16 and the intermediate member 14. As the upper member 16 moves downwardly it releases the lock between the intermediate member 14 and the lower member 12.

This is preferably accomplished by the safety means illustrated in FIGS. 3–8. As can best be seen in FIGS. 3 and 6, a pin 60 is carried in a radially extending bore 62 formed in the flange portion 42 of the upper member 16. Outward extension of the pin 60 is limited by an enlarged head portion 64 engaging with a shoulder 66 formed in the bore 62. A spring 68 disposed intermediate the head portion 64 and a plug 70 urges the pin 60 to its outermost position. A circumferential groove 72 is provided on the inner face of the intermediate member 14 to receive the pin 60 and to thereby lock the intermediate member 14 and the upper member 16 together.

To retract the pin 60, a rod 74 is provided extending through a bore 76 formed in the wall of the upper member 16. The lower end of the rod 74 is formed with a cam face 78 (FIG. 6) which cooperates with a cam face 80 formed at the entrance to a transverse bore 82 in the pin 60 to retract the pin 60 against the spring 68 when the rod 74 is moved downwardly into the transverse bore 82. Thus when the rod 74 is moved upwardly out of the transverse bore 82 the pin 60 is moved outwardly by the spring 68 and if aligned with the groove 72 in the intermediate member 14 the pin 60 will be moved to the position shown in FIG. 1. Downward movement of the rod 74 causes the cam face 78 to engage the cam face 80 of the pin 60 to thereby retract the pin 60 to the position shown in FIG. 6.

As can best be seen in FIGS. 3 and 5, axial movement of the rod 74 is accomplished by rotating a handle 90. Rotation of the handle 90 rotates an internally threaded member 92 which receives a threaded end 94 of the rod 74 to move the rod 74 either upwardly or downwardly depending upon the direction of rotation of the handle 90.

Still referring to FIGS. 3 and 5, a valve 96 is carried on the upper face of the upper member 16 beneath the lift member 50. A passage 98 formed in the upper member 16 communicates the chamber 18 to the valve 96. The valve 96 is operable to be opened by depressing a button 100 and opening the valve 96 exhausts air from the chamber 18.

As can best be seen in FIGS. 3, 5 and 8, the member 92 is provided with a cam face 102 which is operable to engage and depress the valve button 100 upon the handle 90 being rotated to a position disengaging the pin 60 from the groove 72. Thus actuation of the handle 90 releases air from the jack 10 and simultaneously disengages the lock between the upper member 16 and the intermediate member 14 so that the jack 10 can begin to collapse.

As can best be seen in FIG. 3, a pin 104 substantially identical to the pin 60 is carried in the flange portion 34 of the intermediate member 14 and is adapted to extend into a groove 106 to lock the intermediate member 14 and the lower member 12 together. A rod 108 similar to rod 74 is adapted to retract the pin 104 upon downward movement in the manner described above with respect to the pin 60 and the rod 74. The rod 108 is disposed within an axially extending bore 110 formed in the wall of the intermediate member 14 and has an upper portion extending upwardly above the intermediate member 14 when the pin 104 is in its extended position. The upper portion of the rod 108 is adapted to be engaged by the flange 46 carried by the upper member 16 so that upon the upper member 16 collapsing into the intermediate member 14 the rod 108 is depressed retracting the pin 104 and unlocking the members 12 and 14. This, of course, permits the intermediate member 14 to collapse into the lower member 12 as air continues to be exhausted through the valve 96.

As can best be seen in FIG. 7 a guide pin 120 registers with an elongated slot 122 formed in the rod 108 to maintain the rod 108 in a properly rotated position to thereby maintain the cam face at the end of the rod 108 properly aligned with the cam face of the pin 104.

It is apparent then that connecting the cannister 26 to the inlet valve 24 and opening the valve 28 will first move the upper member 16 to its upper extended position. As the pin member 60 is moved into alignment with the groove 72 the pin member 60 will snap into the groove 72 and the upper member 16 will automatically lock in its extended position. After the upper member 16 has moved into its extended position the intermediate member 14 will begin to move up and will continue to do so until the pin member 104 aligns with the groove 106. The pin member 104 will then snap into the groove 106 to automatically lock the intermediate member 14 in its extended position to the lower member 12.

The jack 10 will now be in its extended position and will remain there even if air leaks from the chamber 18.

The pins 60 and 104 will remain in place maintaining the jack in the extended position until they are moved out of position by the rods 74 and 108 respectively. As indicated above movement of the rod 74 is accomplished by rotation of the handle 90 when it is desired to lower the jack and the pin 104 remains in place until the rod 108 is engaged by the flange 46.

It is preferred that the vehicle jack of the present invention be constructed of a lightweight material which is sufficiently strong to take the load of a vehicle. While plastic is preferred it is, of course, apparent that other materials could be used as well.

The lift member 50 is adapted to engage the frame or axle of the vehicle to be lifted and is rotatable around the fastener 52 so that it can assume the proper position as the jack is being extended. The lift member 50 could, of course, take other forms than that shown.

It is apparent that although we have described but one embodiment of our invention many other changes can be made without departing from the spirit of the invention as expressed by the scope of the claims.

We claim:

1. A vehicle jack comprising at least two cylindrical members adapted to be movable from a retracted position to an extended position upon connection with a source of fluid pressure wherein the first of said members is telescoped into the second member, and means for mechanically locking said members in their extended position, said locking means comprising:
   a. a circumferential groove on the inner surface of the upper portion of said second member;
   b. a pin carried in the base of said first member and means resiliently urging said pin radially outwardly from said base to engage said groove when said first member is in its fully extended position to lock said members against further axial movement, and
   c. means to simultaneously release the fluid pressure within said members and to retract said pin thereby permitting said first member to move from said extended position to said retracted position.

2. The vehicle jack as defined in claim 1 wherein said last mentioned means comprises a rod carried by said first member, the lower end of said rod having an inclined face and adapted to engage a slot in said pin to retract said pin upon downward movement of said rod, a handle operable simultaneously to move said rod in a downward direction and to open a valve to exhaust the fluid pressure within said members upon rotation of said handle.

3. The vehicle jack as defined in claim 2 and including a third cylindrical member, said second member being telescopically received by said third member, and a second locking means for mechanically locking said second and third members in their extended position, said second locking means comprising:
   a. a second circumferential groove on the inner surface of the upper portion of said third member;
   b. a second pin carried in the base of said second member and means resiliently urging said second pin radially outwardly from said base of said second member to engage said second groove when said second member is in its fully extended position to lock said second and third members against further axial mvoement, and
   c. means to retract said second pin when said first member is in its fully retracted position.

4. The vehicle jack as defined in claim 3 wherein said last mentioned means comprises a second rod carried by said second member, the lower end of said second rod having an inclined face and adapted to engage a slot in said second pin to retract said second pin upon downward movement of said second rod and the upper end of said second rod extending above the upper surface of said second member, and a cylindrical flange secured to the upper end of said first member, said flange adapted to move said second rod downward when said first member is in its retracted position.

5. The vehicle jack as defined in claim 4 wherein said second rod is secured against rotation.

* * * * *